United States Patent [19]

Schutrum et al.

[11] Patent Number: 4,587,527

[45] Date of Patent: May 6, 1986

[54] CHARGING ELECTRODES BEARING A DOPED SEMICONDUCTOR COATING

[75] Inventors: Walter L. Schutrum, Kettering; Hilarion Braun, Viva Creek, both of Ohio

[73] Assignee: Eastman Kodak Company, Rochester, N.Y.

[21] Appl. No.: 762,808

[22] Filed: Aug. 5, 1985

Related U.S. Application Data

[63] Continuation-in-part of Ser. No. 734,303, May 15, 1985, abandoned.

[51] Int. Cl.$^4$ ........................ G01D 15/18; H05B 47/32

[52] U.S. Cl. ........................................ 346/75; 361/228

[58] Field of Search .................... 346/75; 361/228–229

[56] References Cited

U.S. PATENT DOCUMENTS

| | | | |
|---|---|---|---|
| 3,789,278 | 1/1974 | Bingham et al. | 361/229 |
| 3,813,549 | 5/1974 | Di Stefano et al. | 250/324 |
| 4,047,184 | 9/1977 | Bassous et al. | 346/75 |

*Primary Examiner*—E. A. Goldberg
*Assistant Examiner*—Gerald E. Preston
*Attorney, Agent, or Firm*—Dana M. Schmidt

[57] ABSTRACT

There is described an array of charging electrodes such as are used in ink jet printers. At least portions of the exposed surfaces of such electrodes, used to charge passing ink drops, are overcoated with a continuous coating substantially free of cracks of a semiconductive material doped to have a resistance, at room temperature, when measured transverse to the electrode, of between $10^8$ and $10^{11}$ ohms, such material being essentially insoluble in the ink.

4 Claims, 4 Drawing Figures

CHARGING ELECTRODES BEARING A DOPED SEMICONDUCTOR COATING

This is a continuation-in-part of application Ser. No. 734,303, filed May 15, 1985 (now abandoned).

FIELD OF THE INVENTION

This invention relates to ink jet printers and more specifically to the portion thereof that charges the drops of the ink jet.

BACKGROUND OF THE INVENTION

A recurring problem in ink jet printers is the accidental and undesired contact of the ink jet with the charging electrodes used to charge the jet before or while a drop is being formed in the jet. Such contact has been extremely detrimental in the past, because (a) with some printer designs, this shorts out the electrode and shuts down the printer, and (b) it causes an electrolytic degradation of the metal of the electrode, e.g., dissolution of the metal of the electrode.

To cure this problem, it has not been enough to simply control the purity of the jet. Although ink purity and solubility are factors that affect jets, sooner or later even the cleanest and best maintained printer head experiences some wandering of the jets, particularly in light of the fact that the jet, under some conditions, is as close as 68 $\mu$m to the charging electrodes.

Thus, attempts have been made to apply a thin dielectric coating to the electrodes, to protect them against contact with the ink. A related use of such dielectrics is that described in patents such as U.S. Pat. No. 3,789,278, wherein semiconductive materials such as undoped amorphous silicon, $SiO_2$, $Si_3N_4$, BN and others are described for use in creating a corona discharge. However, such undoped materials have been found to be unsatisfactory in ink jet printers, in that, while protecting the electrodes, they have such a high resistance that the charges formed on the dielectric coating from the ionized air adjacent thereto, build up and interfere with the desired charging of the passing drops. More specifically, the unwanted surface charges on the dielectric cannot dissipate into the charging electrode fast enough to permit the charging of sequential drops which pass by as fast as 10 microseconds apart.

Thus, when read as a whole, it is not true that the aforesaid '278 patent teaches the resistivity need only be $\geqq 10^6$ ohm-cm, notwithstanding the statement in col. 3, line 27. Instead, the materials actually described have a much higher room temperature undoped resistivity. For example, $Al_2O_3=10^{13}$–$10^{15}$, $MgO=1.3\times10^{15}$, $Si_3N_4=10^{13}$, $SiO_2=10^{21}$, amorphous silicon$=10^{12}$, $BN=10^{16}$, and $Ta_2O_5=10^{14}$ ohm-cm. Although ZnO is $10^{10}$ in some cases, it is soluble in some ink and thus unsatisfactory for the instant invention.

The problem then prior to this invention has been to find a way of protecting the charge electrodes from electrolysis damage due to contact with the ink, and at the same time allow ionization charges from the air, to leak back to the charging electrodes.

SUMMARY OF THE INVENTION

This invention is based on the discovery that semiconductive material can be used to form an appropriate protective coating that will leak off sufficient unwanted surface charges, notwithstanding the failure of prior art undoped coatings, if the material is doped sufficiently to bring down the resistivity to $10^8$ to $10^{11}$ ohm-cm.

More specifically, there is provided an array of charging electrod2es for use in an ink jet printer, comprising a dielectric body and plurality of the charging electrodes formed within the dielectric body so as to expose the electrodes at a surface to ink drops passing nearby. This array is improved in that the exposed electrodes are at least partially overcoated with a continuous coating substantially free of cracks of a semiconductive material doped to have a resistance, at room temperature, when measured transverse to the electrode, of between about $10^8$ and about $10^{11}$ ohm, the material having essentially no solubility in ink, whereby the overcoated electrodes are (a) protected from contact with stray ink, and (b) leak off sufficient unwanted surface charges to the charging electrodes.

Thus, it is an advantageous effect of the invention that charging electrodes of ink jet printers are protected against electrolytic damage while at the same time provide the necessary charge leakage for imagewise charging of passing drops.

Other advantageous effects will be readily apparent from the following Description of the Preferred Embodiments when read in light of the attached drawings.

DESCRIPTION OF THE PREFERRED EMBODIMENTS

The invention is particularly described in the preferred embodiments which follow, for use in continuous ink jet printers. In addition, it is applicable to any kind of ink jet printer that uses a charging electrode, no matter how or how often the ink drops are formed.

The invention is based on the discovery that acceptable charge leakage can occur even through a semiconductive coating that otherwise prevents electrolyte degradation of electrodes when shorted by contact with ink. However, to achieve such charge leakage, it is essential that the semiconductive coating be appropriately doped to lower its resistivity to $10^8$ to $10^{11}$ ohm-cm.

Any semiconductive material can be used to form such a protective covering, provided: (a) it forms a continuous coating free of cracks, which practically necessitates that it be amorphous rather than polycrystalline, (b) it has substantially no solubility in the ink, to prevent it from being washed away, and (c) it can be doped or otherwise treated so that its resistance is within the stated range.

Highly preferred as the protective material is amorphous silicon doped with hydrogen. The amount of hydrogen doping depends of course on the desired resistance. For the reasons noted hereinafter, for at least one preferred configuration the resistance value is equal to the resistivity of the material, so that resistivity rather than resistance can be adjusted. That is, a resistivity of $10^8$–$10^{11}$ ohm-cm can be obtained in amorphous silicon by conventional r-f sputtering of a silicon target onto an array of charging electrodes, using a 2% hydrogen gas in argon during the sputtering. Since such sputtering techniques are well known, further discussion is unnecessary. The control of the resistivity by the amount of hydrogen gas present is discussed further in the article "Amorphous Hydrogenated Silicon" by Paul et al, *Solar Energy Materials*, Vol. 5, pp. 229-316 (1981). Other materials are available to form an amorphous semiconductor coating of useful resistivity, or one that is substantially free of cracks. Examples include SiC containing BN, such as Example 39 of EP-A No. 081,365, recited as having a resistivity of $10^{10}$ ohm-cm at room temperature. Such materials are readily sputtered onto the array described above, since the temperature of the substrate (the array) need not be higher than 100° C., using magnetron sputtering.

Figure 1:
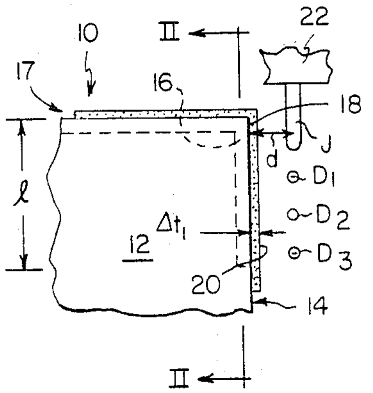
FIG. 1 is a fragmentary, simplified elevational view of an ink jet printer printing head constructed in accordance with the invention.
Figure 2:
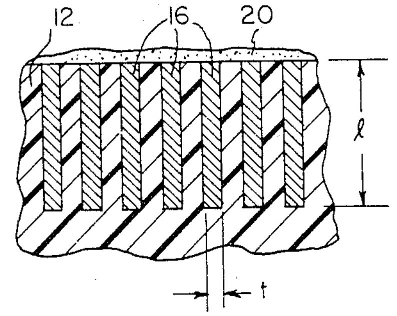
FIG. 2 is a section view taken along the line II—II of FIG. 1.

In one form of arrays of charging electrodes, the electrodes are exposed along only one surface thereof. The ink jet passes by such electrode spaced away from their surface, and drops are induced to have a negative charge when the adjacent electrode is charged while the drop is in the process of separating from the jet. Such an array 10 is shown in FIGS. 1 and 2. That is, a body 12 of dielectric material, such as an epoxy resin, has captured in a face 14 thereof, the array of electrodes 16. Such electrodes are brought to face 14 via face 17, where they form an approximate right angle. Topologically, the electrodes have an order of connectivity equal to zero, that is, they have no holes in them. Except for the coating of semiconductor material which is added per this invention, surfaces 18 of the electrodes are exposed at face 14. The rest of each electrode is embedded within the body 12, by any of several possible techniques which have no bearing on this invention. A representative patent describing such an array of electrodes, and how to form it, is EPO Application No. 132,972.

In operation, as the drops $D_1$, $D_2$, etc. are just breaking off the jet J formed by orifice plate 22, if the adjacent electrode is charged, then the drop will be induced to bear a negative charge. Because the electrode was not so charged for drop $D_2$, that drop is shown as being uncharged, or neutral. Drop $D_3$, however, is to be charged. To achieve all this, any surface charge induced on a coating 20 by ionized air must leak off to the charging electrodes.

The crack-free coating 20 of the semiconductive material is applied onto face 14 over at least part of the exposed electrode surfaces 18, and preferably also the dielectric surfaces between them. The portion of the surfaces 18 that is to be covered are the portions most likely to be attacked electrolytically when the ink jet makes contact. For the embodiment of FIGS. 1 and 2, it is best if the entire surface 18 of each electrode is so covered. Such a coating can extend along face 17 as well. It has been found that, when applied as described with a Δt thickness, FIG. 1, of about $10^{-4}$ cm, such a coating when comprising hydrogen-doped silicon protects the electrodes against electrolyte degradation, and still leaks off the surface charge on coating 20 at a fast enough rate. Δt is preferably $10^{-4}$ cm because on preferred printers, greater thicknesses would tend to interfere with the passage of the jet, and lesser thicknesses would tend to create field intensities that would approach breakdown conditions.

Regarding the lower limit of the resistance, clearly the lower the resistance, the better will be the charge leakage from the surface of coating 20 back to the electrodes. However, the limit of about $10^8$ ohms is reached because at this value the resistance is inadequate to prevent damaging electrolyte current from flowing when an ink jet inadvertently strikes the charging electrodes. That is, it has been determined that, during such contact, the current flow must not exceed $10^{-6}$ amps, as greater amounts cause such electrolysis damage. Since the voltage is preferably about 150 volts, then R, the minimum resistance of the coating, must be $$\geqq \frac{150}{10^{-6}}, \text{ or } \geqq 1.5 \times 10^8 \text{ ohms.}$$

As to the upper limit of the resistance, this can be understood from the following factors: In addition to the effect of the resistance of the film, charge leakage is also affected by the resistance of the air. The two series-connected resistances $R_{film}$ and $R_{air}$ have a current flow $I_{leakage}$. It has been determined experimentally that $I_{leakage}$ must be at least $10^{-10}$ amps to adequately discharge the surface charge back into the electrodes. Such a current flowing through $R_{film}=10^8$ gives a voltage drop of $10^{-2}$ volts across the film. (The voltage drop over the air, being much smaller, can be ignored.) It immediately follows that increasing $R_{film}$ by $10^2$ will increase the voltage drop over $R_{film}$ also by the same factor, to a voltage of 1 volt. This is near the upper limit of acceptable resistance, because experimentally, it can be shown that a change in voltages across the film of greater than 2 volts will adversely affect the image quality of the ink jet printer, if the initial separation distance d from the charge electrode to the ink jet center, FIG. 1 is a preferred spacing of about 70 μm. In actual practice, it has been found that a resistance of about $10^{11}$ ohms is also useful, particularly in conditions of high relative humidity.

The use of resistivity values as an estimate of the aforesaid resistance values derives from the following:

$$\text{Resistance } R = \frac{\rho(\text{resistivity}) \cdot \Delta t}{A}$$

The optimum Δt, as explained above, is $10^{-4}$ cm, and l preferably $=8\times10^{-2}$ cm, FIG. 1. Furthermore, the exposed area A of each electrode 16 over such l distance is preferably $3\times10^{-4}$ cm (l×t, FIG. 2). Thus, $$R = \frac{\rho \times 10^{-4}}{3 \times 10^{-4}}$$

$$\cong \frac{1}{3}\rho \cong \rho$$

Figure 3:
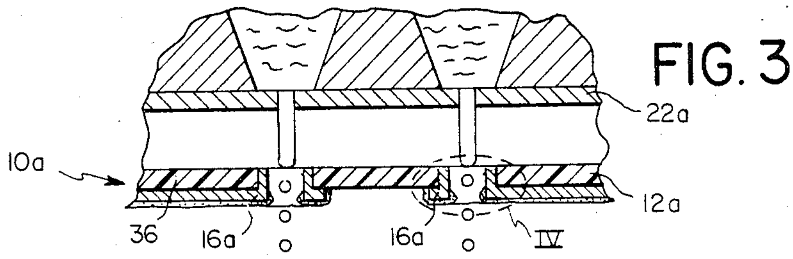
FIG. 3 is a fragmentary section view of an alternative embodiment of an array of charging electrodes, illustrating the invention.
Figure 4:
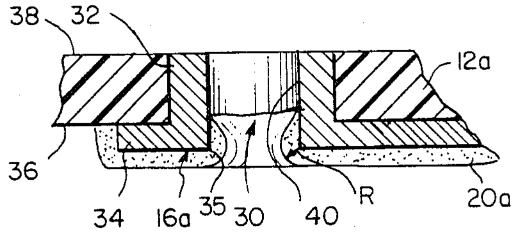
FIG. 4 is an enlarged section view of the portion of FIG. 3 marked "IV".

The invention is also applicable to electrodes having other configurations. For example, certain charging electrodes have a topological order of connectivity of two, that is, they are annularly shaped, FIGS. 3 and 4. (As in all the Figures, parts are not drawn to scale.) Parts similar to those previously described bear the same reference numeral, to which a distinguishing suffix "a" is appended. Thus, array 10a comprises a plurality of electrodes 16a, which however are annular, with openings 30, FIG. 4. The array as before is mounted in a body 12a of dielectric material, and cooperates with an orifice plate 22*a* to charge drops as they form within the openings 30. Because of the way in which electrodes 16*a* are made, they comprise a cylindrical portion 32 and rim portion 34 joining at edge 35, FIG. 4. As shown, rim portion 34 is on surface 36 of body 12*a* that is opposite to surface 38 that faces the orifice plate 22*a*. However, this is of little consequence, since the design can be reversed with rim portion 34 on surface 38.

The coating 20*a* of this embodiment covers all electrode surfaces exposed on body surface 36, as well as edge 35. This embodiment illustrates a case in which the protective coating 20*a* preferably does not cover all the exposed surface-forming openings 30 of electrodes 16*a*. The reason is that any ink touching the top portion(s) 40 of such surface or opening, in contrast to the bottom portion(s) covered by coating 20*a*, is not likely to also extend sideways to adjacent electrodes and cause electrolytic damage. Alternatively, of course, such coating 20*a* can cover all of the surface forming openings 30 as well as the exposed portions of rim 34.

As noted, coating 20*a* does cover edge 35. It is preferred that the coating thickness at this edge, expressed as a radius of curvature, be about 1 $\mu$m.

Further details of annular electrodes and methods of making them can be found in U.S. Pat. No. 4,334,232, issued June 8, 1982.

The following example further illustrates the scope of the invention.

EXAMPLE

A sputtering chamber containing an assembly of charging electrodes was prepared as follows:

The chamber was evacuated to $10^{-5}$ Torr, after which a two-minute oxygen etch treatment of the charging electrodes was given at 400 v, using a $2\times10^{-3}$ Torr bleed line. Thereafter the chamber was evacuated to a vacuum of $10^{-6}$ Torr.

To provide for the hydrogen doping gas, a hydrogen bleed line was opened, delivering hydrogen so that the pressure in the chamber was $8\times10^{-6}$ Torr. Then an argon line was opened at a pressure of $2.5\times10^{-3}$ Torr, and the vacuum pump was throttled back to allow the total pressure in the chamber to equilibrate at about $10^{-2}$ Torr. At this point, the target was presputtered onto a dummy surface at 2000 v for 5 min. to clean the target. Thereafter, the assembly of charging electrodes was coated by sputtering at 2000 v for 1 hr at 11 min. The coating was found to be about 1 $\mu$m thick with a resistivity of about $10^8$ ohm-cm.

The invention has been described in detail with particular reference to preferred embodiments thereof, but it will be understood that variations and modifications can be effected within the spirit and scope of the invention.

What is claimed is:

1. An array of charging electrodes for use in an ink jet printer, comprising a dielectric body and a plurality of said charging electrodes formed within said dielectric body so as to expose said electrodes at a surface of said body to ink drops passing nearby, the improvement wherein each of said exposed electrodes is at least partially overcoated with a continuous coating substantially free of cracks of a semiconductive material doped to have a resistance, at room temperature, when measured transverse to the electrode, of between about $10^8$ and about $10^{11}$ ohm, said material having essentially no solubility in ink, whereby the electrodes where overcoated (a) are protected from contact with stray ink, and (b) leak off surface charges on said continuous coating to said electrodes.

2. An array of charging electrodes for use in an ink jet printer, comprising a dielectric body and a plurality of said charging electrodes formed within said dielectric body so as to expose said electrodes at a surface of said body to ink drops passing nearby, the improvement wherein each of said exposed electrodes is at least partially overcoated with a continuous coating of an amorphous semiconductive material doped to have a resistance, at room temperature, when measured transverse to the electrode, of between about $10^8$ and about $10^{11}$ ohm, said material having essentially no solubility in ink, whereby the electrodes where overcoated (a) are protected from contact with stray ink, and (b) leak off surface charges on said continuous coating to said electrodes.

3. An array of charging electrodes as define in claim 1 or 2, wherein said electrodes are shaped to have a topological order of connectivity equal to zero.

4. An array of charging electrodes as defined in claim 1 or 2, wherein said electrodes are shaped to have a topological order of connectivity equal to two.

* * * * *